350-321. SR 6-4-74 OR 3,814,509

United States Patent [19]

Miano

[11] 3,814,509

[45] June 4, 1974

[54] TELEVISION PICTURE PROJECTING DEVICE

[76] Inventor: Gene L. Miano, 446 W. 17th St., Erie, Pa. 16502

[22] Filed: Aug. 18, 1972

[21] Appl. No.: 281,639

[52] U.S. Cl. ................ 350/321, 350/205, 178/7.82, 178/7.91

[51] Int. Cl. .......................................... G02b 27/00

[58] Field of Search ....... 350/321, 319, 6, 236, 205, 350/206; 178/7.82, 7.84, 7.91

[56] References Cited

UNITED STATES PATENTS

| | | | |
|---|---|---|---|
| 2,963,173 | 12/1960 | Barnes | 211/177 |
| 3,064,523 | 11/1962 | Meltzer | 350/235 |
| 3,511,571 | 5/1970 | Ogle | 350/6 |
| 3,549,803 | 12/1970 | Becht | 178/7.89 |
| 3,704,939 | 12/1972 | Neergaard | 350/321 |

*Primary Examiner*—Ronald L. Wibert
*Assistant Examiner*—Michael J. Tokar

[57] ABSTRACT

The present invention relates to a means for displaying a television picture on a large screen made of translucent material by means of a double convex lens located at its focal distance from the television picture and the screen located at a predetermined distance in front of the lens. The area between the television and the screen is enclosed by a black cloth or other black material. A partition made of pegboard is disposed between the screen and the television and the double convex lens is set in an opening in the partition.

3 Claims, 1 Drawing Figure

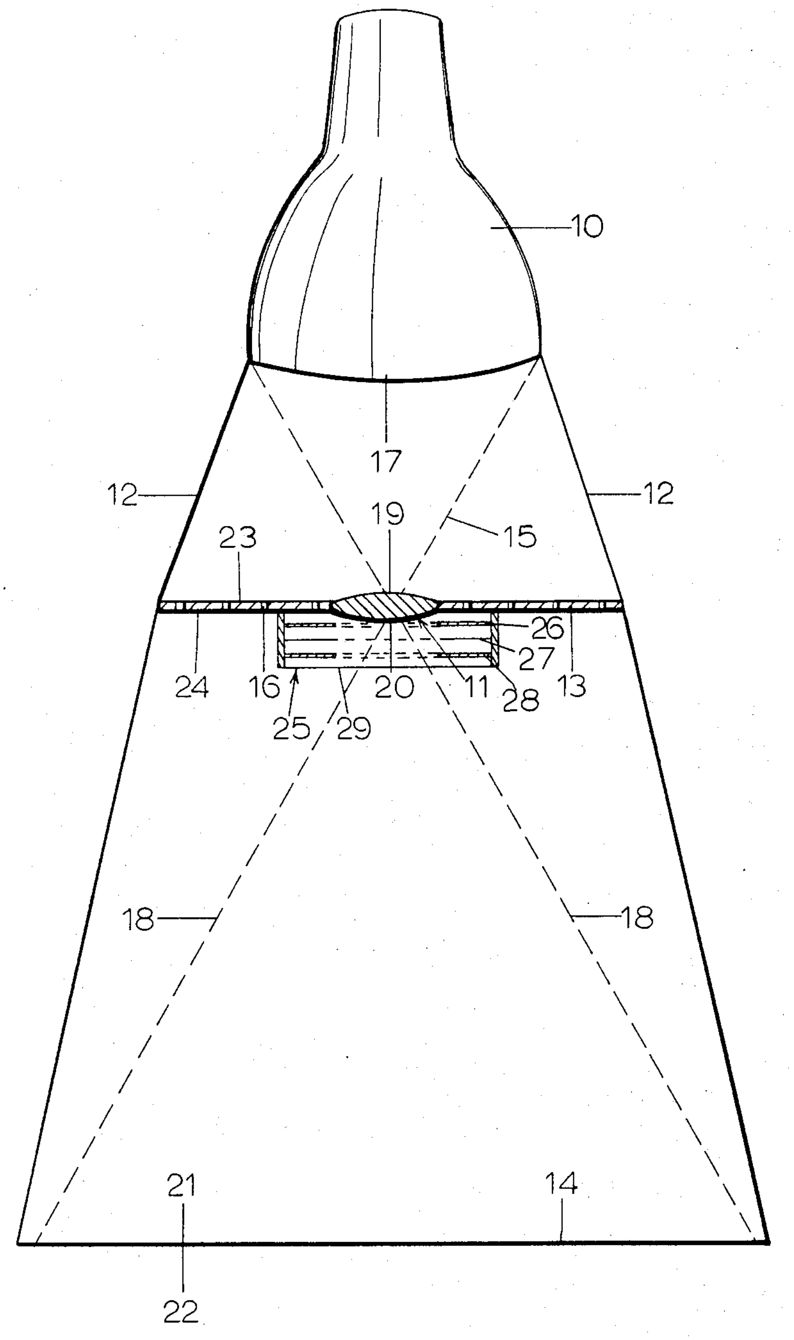
10
12
12
17
19
15
23
26
27
24
16
20
11
28
13
25
29
18
18
21
14
22

TELEVISION PICTURE PROJECTING DEVICE

OBJECTS OF THE INVENTION

It is an object of the invention to provide a new and improved means for projecting television images from ordinary television tubes onto large screens.

It is another object of the invention to provide a means for projecting television images from cathode tubes onto large screens that is simple in construction, economical to manufacture, and inexpensive and efficient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

GENERAL DESCRIPTION OF THE DRAWING

The drawing shows a top view of the apparatus with some parts shown in cross section for better understanding.

DETAILED DESCRIPTION OF THE DRAWING

Now with more particular reference to the drawing, there is shown an ordinary television set with a picture tube 10 of any suitable size which performs its usual function of receiving visual signals and presenting them on the television screen 17 in a size limited by the size of the picture tube 10. A double convex lens 11 is located a suitable distance in front of the picture tube 10 determined by the focal distance of the lens and it is centered in front of the picture tube 10.

The double convex lens 11 has a first side 19 which faces the television screen 17 and a second side 20 which faces a large backlight screen 14. The large backlight screen 14 is placed a suitable distance in front of the double convex lens 11 and has a first side 21 which faces the double convex lens 11 and a second side 22 which faces away from the double convex lens 11.

The screen 14 is of the type familiar to those skilled in the art which is intended for backlight display. The lens 11 is centered in a pegboard 13 which may be constructed of of fiber board material such as "Masonite", plywood, or other suitable opaque material having small holes 16 distributed about its surface at regular intervals.

A black opaque cloth or other suitable opaque material completely surrounds the area between the television screen 17 and the pegboard 13 and from the pegboard 13 to the backlight screen 14 such that the illumination that reaches the first side 21 of the screen 14 is light emitted by the television screen 17 and is projected onto the screen 14 via the lens 11. The pegboard 13 with small holes 16 is placed at the lens 11 to improve the contrast of the picture. The lens 11 is placed at a distance equal to its focal length from the screen to the picture tube 10 and centered relative to the picture 10. The lens will, therefore, focus the picture from the tube 10 onto the screen 14, as indicated by projection lines 18. An adapter 25 can be placed between the lens 11 and the screen to further improve picture contrast. The adapter 25 has a sheet of tin foil 26, a black cloth 27, and another sheet of tin foil 28 placed parallel to each other and received in a shallow rectangular box 29. Box 29 has no top or bottom and tin foil 26, black cloth 27, and tin foil 28, each have a hole in the middle, through which the picture is projected. The picture may then be viewed in enlarged form from the second side 22 of the backlight screen 14.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A television picture enlarging device comprised of a picture tube, a backlighted screen spaced from said picture tube, a pegboard having a central opening and spaced small openings, a double convex lens in said opening of said pegboard, and an opaque cover enclosing said tube and said screen such that only light from the said picture tube reaches the side of said screen away from the viewer, said light being able to pass both through said openings in said pegboard and through said double convex lens.

2. The television picture enlarging device recited in claim 1 wherein the pegboard is made of fiber board.

3. The device recited in claim 1 wherein a box is disposed between said lens and said screen, said box having an open top and an open bottom, two spaced sheets of reflective tin foil being disposed in parallel planes in said box, a sheet of black material between said foil sheets, and an opening in said foil sheets and in said black sheet, said openings being aligned with each other.

* * * * *